United States Patent
Sinha et al.

(10) Patent No.: US 8,178,146 B2
(45) Date of Patent: May 15, 2012

(54) PROCESS FOR PRODUCING REFRIGERATED PRODUCE

(75) Inventors: Nirmal K. Sinha, Frankfort, MI (US); Meena Sinha, Frankfort, MI (US)

(73) Assignee: Graceland Fruit, Inc., Frankfort, MI (US)

( * ) Notice: Subject to any disclaimer, the term of this patent is extended or adjusted under 35 U.S.C. 154(b) by 869 days.

(21) Appl. No.: 10/840,725

(22) Filed: May 6, 2004

(65) Prior Publication Data

US 2005/0249847 A1 Nov. 10, 2005

(51) Int. Cl.
*A23B 7/08* (2006.01)

(52) U.S. Cl. ........ 426/323; 426/310; 426/326; 426/333; 426/335; 426/615; 426/637; 426/639; 426/640; 426/520

(58) Field of Classification Search .................. 426/324, 426/639, 640, 281, 310, 335, 615, 323, 326, 426/331, 333, 465, 520, 637
See application file for complete search history.

(56) References Cited

U.S. PATENT DOCUMENTS

| | | | |
|---|---|---|---|
| 2,420,517 A | | 5/1947 | Brander et al. |
| 2,785,071 A | | 3/1957 | Mathews |
| 3,623,893 A | * | 11/1971 | Mauge ............................ 426/281 |
| 3,634,104 A | | 1/1972 | Kaplow |
| 3,745,027 A | * | 7/1973 | Kaplow et al. ................. 426/331 |
| 4,042,716 A | | 8/1977 | Bertram et al. |
| 4,183,963 A | | 1/1980 | Brimelow et al. |
| 4,256,772 A | | 3/1981 | Shanbhag et al. |
| 4,313,967 A | | 2/1982 | Kahn et al. |
| 4,390,550 A | | 6/1983 | Kahn et al. |
| 4,446,161 A | | 5/1984 | Friedman et al. |
| 4,542,033 A | | 9/1985 | Agarwala |
| 4,551,348 A | | 11/1985 | O'Mahony et al. |
| 4,562,080 A | | 12/1985 | Tenn |
| 4,683,141 A | | 7/1987 | Lewis et al. |
| 4,713,252 A | | 12/1987 | Ismail |
| 4,832,969 A | | 5/1989 | Lioutas |
| 4,946,693 A | | 8/1990 | Risler et al. |
| 4,946,694 A | | 8/1990 | Gunnerson et al. |

(Continued)

FOREIGN PATENT DOCUMENTS

EP 1180328 A2 2/2002

(Continued)

OTHER PUBLICATIONS

David A. Bender. "intermediate moisture foods." A Dictionary of Food and Nutrition. Oxford University Press. 2005. HighBeam Research. Jul. 15, 2010 <http://www.highbeam.com>.*

(Continued)

*Primary Examiner* — Drew Becker
*Assistant Examiner* — Luana Z Long
(74) *Attorney, Agent, or Firm* — Mitchell Intellectual Property Law, PLLC

(57) ABSTRACT

The present invention includes a process for producing substantially stable produce, typically vegetables and fruit that can be stored in a refrigerated environment for at least about five weeks without preservatives and at least about three months with preservatives. The process involves holding the produce in an aqueous immersion solution that includes a cellular stabilizing agent for a time sufficient to convert the produce into a heat durable piece and thermally processing the heat durable produce in the immersion solution. The use of additional ingredients as components of the immersion solution such as sweeteners, acids, salt, and preservatives are optional.

39 Claims, 1 Drawing Sheet

U.S. PATENT DOCUMENTS

| | | | |
|---|---|---|---|
| 5,000,972 A | | 3/1991 | Nafisi-Movaghar |
| 5,013,576 A | | 5/1991 | Nakazawa et al. |
| 5,100,684 A | | 3/1992 | El-Nokaly et al. |
| 5,110,609 A | | 5/1992 | Lewis et al. |
| 5,151,286 A | | 9/1992 | Adams et al. |
| 5,192,572 A | | 3/1993 | El-Nokaly et al. |
| 5,320,861 A | | 6/1994 | Mantius et al. |
| 5,368,873 A | | 11/1994 | Aebi et al. |
| 5,484,616 A | * | 1/1996 | Vellucci et al. ............... 426/242 |
| 5,486,369 A | * | 1/1996 | Mason et al. ................. 426/321 |
| 5,518,747 A | | 5/1996 | Pike, Jr. |
| 5,711,984 A | | 1/1998 | Woodward et al. |
| 5,718,939 A | | 2/1998 | Nugent |
| 5,932,270 A | | 8/1999 | Rock et al. |
| 5,935,631 A | | 8/1999 | Golden et al. |
| 6,001,407 A | | 12/1999 | Lewis et al. |
| 6,027,758 A | | 2/2000 | McHugh et al. |
| 6,146,683 A | * | 11/2000 | Scharf ........................... 426/638 |
| 6,183,797 B1 | * | 2/2001 | Dull .............................. 426/507 |
| 6,391,376 B1 | | 5/2002 | Hansen et al. |
| 6,403,134 B1 | | 6/2002 | Nayyar et al. |
| 6,488,975 B1 | | 12/2002 | Sethi et al. |
| 6,524,640 B1 | | 2/2003 | Sinha |
| 6,528,104 B1 | | 3/2003 | Jindra et al. |
| 6,572,908 B2 | | 6/2003 | Kemp et al. |
| 6,572,910 B2 | | 6/2003 | Lanner et al. |
| 6,602,532 B2 | | 8/2003 | Yamada et al. |
| 2002/0028273 A1 | | 3/2002 | Teras et al. |
| 2002/0054950 A1 | | 5/2002 | Selleck |
| 2002/0168459 A1 | | 11/2002 | Rock et al. |
| 2003/0068427 A1 | | 4/2003 | Wysocki |
| 2003/0091707 A1 | | 5/2003 | Jindra et al. |
| 2003/0185946 A1 | | 10/2003 | Ii et al. |
| 2003/0185961 A1 | | 10/2003 | Sault et al. |

FOREIGN PATENT DOCUMENTS

| | | |
|---|---|---|
| EP | 1180328 A3 | 11/2003 |

OTHER PUBLICATIONS

Lori, Dahm, Food R & D, Refrigerated & Frozen Foods, Jul. 2000, pp. 34, 36-39.

Michael S. Curiale, Limiting Growth: Microbial Shelf-Life Testing, Food Product Design, Feb. 1998.

Guohus Cao et al., Antioxidant Capacity of Tea and Common Vegetables, J. Agric. Food Chem. vol. 44, No. 11, 1996, pp. 3426-3431.

W. C. Griffin et al., Polyhydric Alcohols, Chapter 10, Handbook of Food Additives, 2nd Edition, pp. 431-455, 1972.

Danila Torreggiani et al., Osmotic Dehydration of Fruit, Journal of Food Processing & Preservation 12 (1987), pp. 27-43.

Larry R. Beuchal, Microbial Stability as Affected by Water Activity, Cereal Foods World, Jul. 1981, vol. 26, No. 7, pp. 345-349.

C. R. Lerici et al., Osmotic Dehydration of Fruit: Influence of Osmotic Agents on Drying Behavior and Product Quality, Journal of Food Science, vol. 50 (1985), pp. 1217-1219, 1226.

* cited by examiner

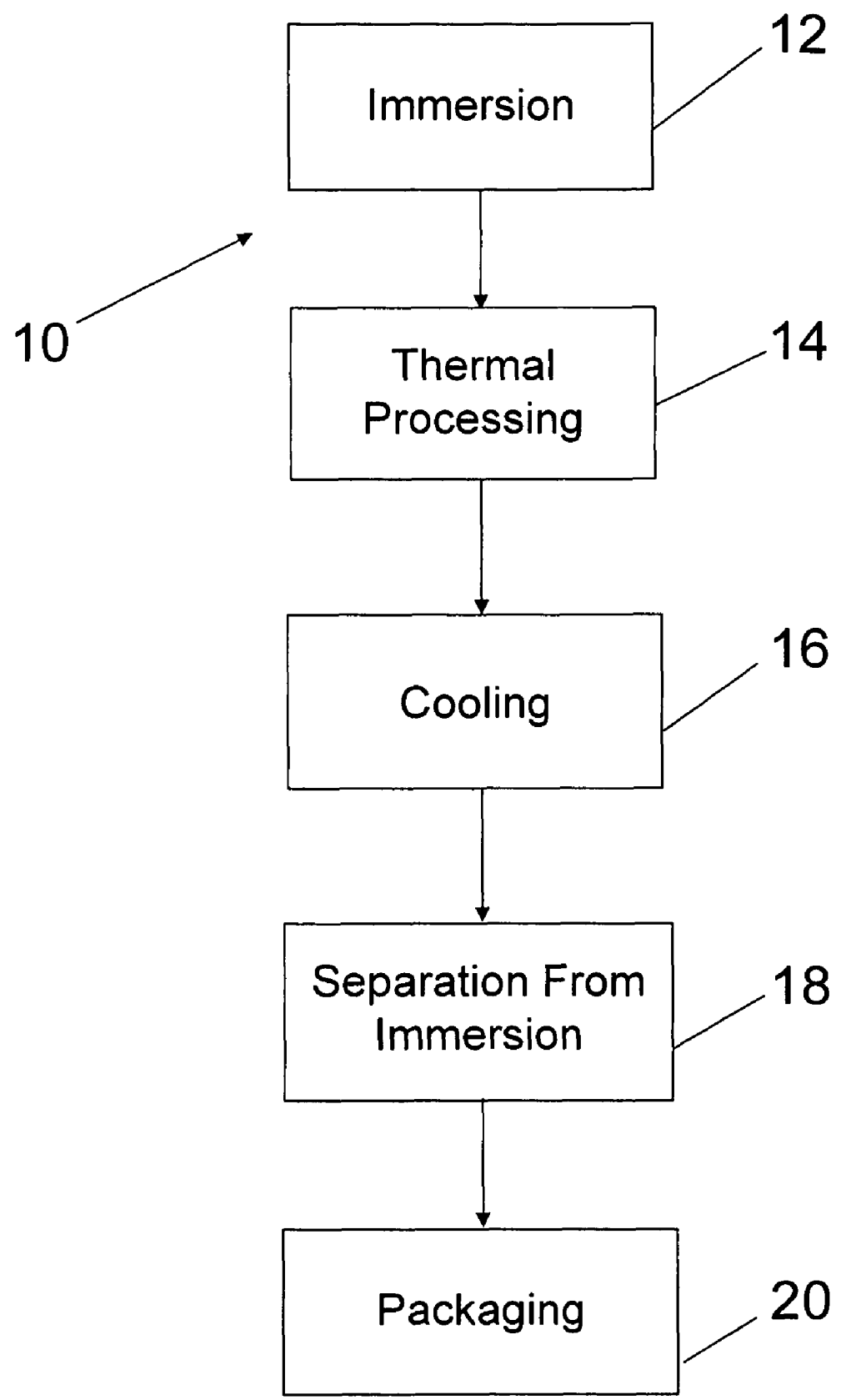

PROCESS FOR PRODUCING REFRIGERATED PRODUCE

BACKGROUND OF THE INVENTION

The health benefits of eating produce have created interest in developing safe, convenient, nutritious and affordable quality produce while, as best as possible, maintaining the natural state of the produce. Several processes are available to extend the shelf life of produce. Traditional techniques include drying, canning, and freezing. Still other known methods, for example, require blanching, infusion, drying, rehydration, draining, thawing, and preservation using salts or acids. Processing that comprises a large number of components can be cumbersome to monitor during processing. A need exists in the food industry for a straightforward process for producing vegetables with an extended shelf life while maintaining a fresh appearance and taste, preferably without the use of preservatives. Modified packaging techniques and processing techniques are also sometimes used to extend shelf life. However, produce processed using these techniques generally do not provide the flavor, color and texture of home cooked or fresh produce. Often, produce products processed by these and other know techniques appear over-engineered and include a multitude of preservatives and other ingredients.

SUMMARY OF THE INVENTION

An embodiment of the present invention includes a process for producing stable produce by immersing a produce piece in an aqueous solution comprising a cellular stabilizing agent, thermally processing the produce piece in the solution, cooling the produce piece, separating the processed produce from the immersion solution, and packaging the processed produce. The resultant processed produce piece remains substantially stable for at least about five weeks in a refrigerated environment without utilizing a preservative.

Another embodiment of the present invention includes a process for producing stable vegetables by providing at least one vegetable piece in an aqueous immersion solution that includes at least one cellular stabilizing agent, immersing the vegetable piece in an aqueous immersion solution for a time sufficient to convert the vegetable piece into a heat durable vegetable piece, thermally processing the vegetable piece in the immersion solution, cooling the vegetables in the immersion solution to about ambient temperature or less, separating the processed vegetables from the immersion solution, and packaging the processed vegetable pieces. The processed vegetable pieces thereby produced typically have a water activity of from about 0.82 to about 0.98 and a percent moisture content of from about 39% to about 55% and remain stable for at least about five weeks in a refrigerated environment when the immersion solution is substantially free of a preservative and at least about three months in a refrigerated environment when the immersion solution includes a preservative.

Yet another embodiment of the present invention includes a stable produce product, typically a vegetable product, that substantially maintains color, flavor, texture, and microbrial quality for at least about five weeks in a refrigerated environment produced by: providing at least one produce piece in an aqueous immersion solution having at least one cellular stabilizing agent, immersing the vegetable piece in the aqueous immersion solution for a time sufficient to convert the vegetables pieces into a heat durable vegetable piece, thermally processing the vegetable piece in the immersion solution, cooling the produce in the immersion solution to about ambient temperature or less, separating the processed produce from the immersion solution, and packaging the processed produce pieces. The processed produce piece(s) typically has a water activity of from about 0.82 to about 0.98 and a percent moisture content of from about 39% to about 55% and remains stable for at least about five weeks in a refrigerated environment when the immersion solution is substantially free of a preservative and at least about three months in a refrigerated environment when the immersion solution further includes a preservative.

Another embodiment of the present invention includes a processed produce product, typically a vegetable, having a water activity of from about 0.82 to about 0.98 and a moisture content of from about 39% to about 55% wherein the processed produce is shelf-stable in a refrigerated environment for at least about five weeks when the processed produce is substantially free of a preservative.

These and other features, advantages and objects of the present invention will be further understood and appreciated by those skilled in the art by reference to the following specification, claims and appended drawing.

BRIEF DESCRIPTION OF THE DRAWINGS

FIG. 1. is a process flow chart generally showing the process steps for processing produce according to the present invention.

DETAILED DESCRIPTION OF PREFERRED EMBODIMENTS

Produce pieces, typically fruit or vegetable pieces, suitable for use in the present invention can be either fresh or frozen. They may also be either whole or sectioned. The produce pieces are most typically vegetables such as red, green or yellow bell pepper, broccoli, green beans, zucchini, sweet corn, green peas, potato, tomato and mushroom, but fruit, such as pineapple, may also be processed according to the present invention. Generally, (see FIG. 1) in the process for producing stable produce 10, the produce pieces are generally immersed 12 in an aqueous solution that typically includes at least one cellular stabilizing agent, usually at about ambient temperature. The vegetables and the immersion solution are typically thereafter heated or otherwise thermally processed 14 to a temperature of from about 180° F. to about 195° F. for typically about five minutes or less. Next, the produce in the immersion solution is typically cooled 16 to about ambient temperature. The produce is typically thereafter separated 18 from the immersions solution and packaged 20. It is presently believed that heating and holding the vegetables in the immersion solution of the present invention plays a key role in the improved extended shelf life of the processed produce while allowing the produce to substantially retain its color, texture, taste, and other organoleptic properties.

The immersion solution typically includes at least one cellular stabilizing agent. The cellular stabilizing agent typically is a polyhydric alcohol or a water soluble bulking agent such as polydextrose which contributes to cellular stability without sweetness. Polyhydric alcohols typically include carbohydrate derivatives that contain hydroxyl groups as functional groups and are generally water soluble, hygroscopic compounds. Polyhydric alcohols typically utilized include glycerin, polydextrose, propylene glycol, and sorbitol. Sorbitol may be utilized as the cellular stabilizing agent; however, because sorbitol is also a sweetener, if used as the cellular stabilizing agent, salt typically is also added to the immersion solution. It is presently believed the addition of salt counteracts the sweetness that may be added to the produce piece when the sorbitol is utilized as the cellular stabilizing agent. If the vegetable is cucumber, polydextrose is the cellular stabilizing agent typically utilized. When propylene glycol is utilized as the cellular stabilizing agent, typically maltodextrin or corn syrup must be added to the immersion solution. The sweetness of the corn syrup and/or the maltodextrin offsets the typically bitter taste imparted to the produce piece by the propylene glycol. The most typically utilized polyhydric alcohol is glycerin. Glycerin binds well with water and possesses higher solids than the other polyhydric alcohols, which increases the solids in vegetables. Also, glycerin is generally more heterogeneously water dispersible, which facilitates its use as a cellular stabilizing agent. It is presently believed that a mixture of the cellular stabilizing agents may also be used. The immersion solution of the present invention typically comprises from about 5% to about 60% cellular stabilizing agent.

The immersion solution may also optionally include at least one sweetener, salt, acids, and preservatives. An acid is typically utilized if the produce piece is prone to browning due to oxidation. An acid is typically a component of the immersion solution when processing mushrooms, potatoes, and pineapple due to their generally high amounts of oxidative enzymes. Most typically, citric acid and ascorbic acid and other similar acids are utilized. Mixtures of acids, including a mixture of citric acid and ascorbic acid, may also be employed in the immersion solution. When utilized, the immersion solution of the present invention typically includes from about 0.1% to about 0.5% by weight acid.

Without the use of a preservative, the processed vegetables of the present invention will remain shelf-stable for at least five weeks. Although optional, the use of at least one preservative further extends the stability of the processed vegetables in a refrigerated environment from at least about five weeks to at least about three months. When utilized, potassium sorbate, sodium benzoate, sodium lactate, sulfites, and mixtures thereof are most typically employed and are most typically included as a component of the immersion solution. The immersion solution may include more than one preservative. The most typical preservatives are potassium sorbate and sodium benzoate. When included in the immersion solution of the present invention, the preservative(s) typically makes up from about 0.1% to about 0.5% by weight preservative.

If desired, a sweetener may be included in the immersion solution. Sweeteners useful in the present invention are exemplified by corn syrup, polydextrose, maltodextrin, and high maltose corn syrup. Typically, the sweetener is maltodextrin, polydextrose, and/or corn syrup. More typically, the sweetener is corn syrup. When the sweetener is utilized as a component of the immersion solution, the immersion solution typically includes from about 0.1% to about 35% by weight sweetener.

Salt is another optional component of the immersion solution. As discussed above, salt is most typically utilized to offset sweetness imparted by a particular cellular stabilizing agent such as corn syrup, maltodextrin, or sorbitol. However, salt may be included in the immersion solution regardless of which cellular stabilizing agent is employed. When salt is utilized as a component of the immersion solution, the immersion solution comprises from about 1% to about 2% salt.

The typical first step in processing the vegetables typically involves immersing at least one produce piece, more typically many pieces, in the immersion solution at ambient temperatures for a time sufficient to convert the cellular structure and texture of the produce piece so that it is capable of withstanding heat and maintaining minimum loss of cellular fluids. This step facilitates hydration of the produce. It is presently believed this hydration step helps stabilize the produce's cellular structure thereby making the produce more thermally stable. Most typically, the produce is held in the immersion solution for about one hour. The produce piece is held only as long as necessary to convert it into a heat durable produce piece. The time required depends on the type of produce being processed and the specific immersion solution.

Next, the produce piece in the immersion solution is typically thermally processed. Typically, the ratio of produce to immersion solution is from about 1:1.5 to about 1:2.5. Most typically, the ratio of produce to immersion solution is about 1:2. Typically, the heat processing of the produce occurs for about five minutes or less at a typical temperature of from about 180° F. to about 195° F. The produce pieces in the immersion solution may also be agitated during thermal processing. Agitation facilitates heat transfer and accordingly decreases processing time. Also, agitation during thermal processing typically results in better texture and color of the processed produce.

After thermal processing, the produce in the immersion solution is typically cooled to about ambient temperature, more typically to less than about 60° F. The produce is typically thereafter separated from the immersion solution. The processed produce is then typically packed in a sealed bag and stored at refrigerated temperature, typically from about 35° F. to about 40° F. When processed, if the produce is a broccoli floret, zucchini, green beans, green peas, or celery, the processed vegetable piece is typically sealed in translucent bags to prevent color loss.

The resultant produce pieces are ready-to-use produce, typically vegetables, which can be stored at refrigerated temperatures for at least five weeks and up to at least about three months while maintaining their flavor, color, texture, and microbiological safety. The typical water activity of the resultant, processed produce was typically from about 0.82 to about 0.98, more typically from about 0.90 to about 0.96, and most typically from about 0.90 to about 0.93. The typical percent moisture of the resultant, processed produce was typically from about 39% to about 55%, more typically from about 50% to about 54%, and most typically from about 51% to about 53%. In one embodiment, the processed vegetables and the spent immersion solution were both tested and found to have the microbiological quality as shown below in Table 1.

TABLE 1

Microbiological Quality of Processed Vegetables and Spent Immersion Solution

| Microbiological Parameter | Processed Vegetables | Spent Immersion Solution |
|---|---|---|
| Aerobic plate count | <10/gram | <10/gram |
| Coliform | Negative | Negative |
| E. Coli | Negative | Negative |
| Staphylococcus Coagulase Positive | Negative/25 gram | Negative/25 gram |
| Salmonella | Negative/25 gram | Negative/25 gram |
| Yeast | <10/gram | <10/gram |
| Mold | <10/gram | <10/gram |
| Listeria | Negative/25 gram | Negative/25 gram |
| Potassium Sorbate | Less than 0.1% | Less than 0.1% |
| Sodium benzoate | Less than 0.1% | Less than 0.1% |
| Salt | Less than 1.0% | Less than 1.0% |

Processing did not significantly alter the color of the vegetables. The color of various vegetables was measured by a Hunter Colorimeter both before processing and after processing. The process of the present invention caused little change in the green color of vegetables. Similarly, little change in color after processing was observed in other vegetables. Specific calorimetric measurements for various produce are listed in Table 2 below.

TABLE 2

| | Colorimetric Measurements | | | | | | | |
|---|---|---|---|---|---|---|---|---|
| | Before Processing | | | | After Processing | | | |
| Vegetable | L | a* | b* | h* | L | a* | b* | h* |
| Red Pepper | 41.01 | 31.61 | 32.75 | 46.01 | 33.32 | 41.24 | 34 | 49.5 |
| Green Pepper | 29.82 | −8.70 | 23.02 | 110.7 | 34.13 | −7.59 | 23.27 | 108.07 |
| Broccoli | 44.55 | −12.47 | 30.81 | 112.03 | 46.94 | −10.5 | 30.79 | 108.78 |
| Green Beans | 26.58 | −4.92 | 19.22 | 104.35 | 25.77 | −6.37 | 21.00 | 106.88 |
| Zucchini | 79.75 | −2.91 | 27.99 | 95.94 | 59.00 | −2.89 | 31.58 | 95.22 |
| Sweet Corn | 66.53 | 12.06 | 46.65 | 75.51 | 57.78 | 11.90 | 62.15 | 79.16 |
| Green Peas | 42.41 | −12.97 | 29.41 | 113.79 | 29.65 | −11.90 | 27.91 | 113.03 |
| Potato | 75.31 | −0.90 | 19.21 | 92.69 | 64.02 | −3.80 | 12.23 | 107.26 |
| Mushroom | 76.30 | 3.31 | 13.15 | 75.87 | 58.35 | 9.87 | 20.09 | 71.11 |
| Tomato | 22.50 | 28.12 | 18.15 | 32.83 | 23.00 | 29.75 | 25.29 | 40.37 |

As shown above in Table 2, before and after processing, the color of the pepper measured by a Hunter calorimeter was as shown. L* designates lightness on a scale of 0 to 100 (with 0 for black and 100 for white); a* designates red to green, where a negative a* denotes green; b* designates yellow to blue, where a negative b* denotes blue; and h* designates the hue angle ($\tan^{-1} b/a$).

Significantly, the process for treating the produce causes very little loss of nutrients. For example, red bell pepper was analyzed for vitamin A and vitamin C. The processed red bell pepper contained about 4029 IU per 100 grams of vitamin A and about 53.3 IU per 100 grams of vitamin C. The vitamin A and vitamin C content of a typical unprocessed chopped frozen red bell pepper is 4762 IU and 58.7 IU per 100 grams respectively.

EXAMPLE 1

Processing Red, Green, or Yellow Bell Pepper

Three pounds of fresh or frozen red, green, or yellow bell peppers, cut into one inch pieces, were processed in about six pounds of an immersion solution. The immersion solution included from about 50% to about 55% by weight water, from about 30% to about 35% by weight corn syrup, from about 12% to about 17% by weight glycerin, from about 1% to about 2% by weight salt, from about 0.2% to about 0.4% total preservative (from about 0.1% to about 0.2% by weight potassium sorbate, and from about 0.1% to about 0.2% by weight sodium benzoate). In a stainless steel vessel, the peppers were immersed in the immersion solution for about one hour at about room temperature. Then, the peppers in the immersion solution were heated to about 195° F., with about zero minutes holding time. The peppers were cooled to room temperature, separated from the immersion solution, packed in a sealed bag and stored refrigerated. Other vegetables, such as broccoli florets, cut beans, zucchini, sweet corn, and green peas were also processed as above.

EXAMPLE 2

Processing Potato

Three pounds of fresh, peeled potatoes, cut into one inch pieces, were processed in about six pounds of an immersion solution. The immersion solution included from about 50% to about 55% by weight water, from about 30% to about 35% by weight corn syrup, from about 12% to about 16% by weight glycerin, from about 1% to about 2% by weight salt, from about 0.2% to about 0.4% total preservative (from about 0.1% to about 0.2% by weight potassium sorbate, from about 0.1 to about 0.2% by weight sodium benzoate), from about 0.1% to about 0.2% by weight ascorbic acid, and from about 0.1% to about 0.2% by weight citric acid. Except for the different immersion solution, the potatoes were processed, packaged, and stored as in Example 1.

EXAMPLE 3

Processing Mushrooms

Three pounds of mushrooms were processed in the solution as in Example 2 for potatoes.

EXAMPLE 4

Processing Tomatoes

Three pounds of whole cherry tomatoes were processed in the solution as in Example 1 and in the process as in Example 1, seal packed in a polyethylene bag, and stored at refrigerated temperatures.

EXAMPLE 5

Processing Pineapple

Three pounds of diced, individually quick frozen, golden yellow colored pineapple, cut into one inch pieces, were processed in about six pounds of an immersion solution. The immersion solution included from about 65% to about 70% by weight water, from about 30% to about 35% by weight corn syrup, from about 0.1% to about 0.2% by weight potassium sorbate, from about 0.1% to about 0.2% by weight ascorbic acid, and from about 0.1% to about 0.2% by weight citric acid. The pineapple was otherwise processed, packaged, and stored as in Example 1.

EXAMPLE 6a

Processing Green Peas

One and a half pounds of green peas were processed in about three pounds of an immersion solution. The immersion solution included from about 40% to about 45% by weight water and from about 55% to about 60% by weight glycerin.

The green peas were processed, packaged, and stored as in Example 1.

EXAMPLE 6b

Processing Green Peas

One pound of green peas was processed in about two pounds of an immersion solution. The immersion solution was made up of from about 90% to about 95% by weight water and from about 5% to about 10% by weight polydextrose. The green peas were processed, packaged, and stored as in Example 1.

The above description is considered that of the preferred embodiments only. Modifications of the invention will occur to those skilled in the art and to those who make or use the invention. Therefore, it is understood that the embodiments shown in the drawing and described above are merely for illustrative purposes and not intended to limit the scope of the invention, which is defined by the following claims as interpreted according to the principles of patent law, including the doctrine of equivalents.

The invention claimed is:

1. A process for producing stable produce comprising the steps of:
    providing at least one fresh or fresh frozen produce piece and an aqueous immersion solution comprising at least one cellular stabilizing agent selected from the group consisting of polyhydric alcohols and water bulking agents;
    immersing the produce piece in the aqueous immersion solution which is at about ambient temperature;
    holding the produce piece in the immersion solution at about ambient temperature for about one hour;
    subsequently thermally processing by heating the immersion solution with the produce piece in the immersion solution to a temperature of from about 180° F. to about 195° F. and then holding the immersion solution at said temperature for about five minutes or less, and optionally agitating the produce piece in the immersion solution;
    cooling the thermally processed produce piece in the immersion solution to about ambient temperature or less after thermally processing the produce piece to yield a processed produce piece;
    separating the processed produce piece from the immersion solution; and
    packaging the processed produce piece, at a moisture content of from about 39% to about 55%; and
    wherein the packaged, processed produce piece remain substantially stable at least five weeks in a refrigerated environment without utilizing a preservative.

2. The process for producing stable produce of claim 1, wherein the produce piece comprises a vegetable piece and the ratio of the produce piece to immersion solution is from about 1:1.5 to about 1:2.5.

3. The process for producing stable produce of claim 2, wherein the vegetable piece comprises a vegetable piece chosen from the group consisting of whole, frozen vegetable pieces; whole, fresh vegetable pieces; sectioned, frozen vegetable pieces; and sectioned, fresh vegetable pieces.

4. The process for producing stable produce of claim 3, wherein the at least one cellular stabilizing agent comprises a cellular stabilizing agent chosen from the group consisting of glycerin, polydextrose, sorbitol and propylene glycol.

5. The process for producing stable produce of claim 4, wherein the immersion solution further comprises from about 0.1% to about 0.5% by weight of at least one preservative; and wherein the processed vegetable remains substantially stable for at least about three months in a refrigerated environment.

6. The process for producing stable produce of claim 5, wherein the at least one preservative comprises a preservative chosen from the group consisting of potassium sorbate, sodium benzoate, sodium lactate, and sulfites.

7. The process for producing stable produce of claim 5, wherein the immersion solution further comprises an acid chosen from the group consisting of citric acid and ascorbic acid, or a mixture thereof.

8. The process for producing stable produce of claim 7, wherein the immersion solution further comprises salt, and the amount of salt is from about 0% to about 2% by weight.

9. The process for producing stable produce of claim 7, wherein the immersion solution further comprises at least one sweetener, in an amount from about 0% to about 35% by weight, with said sweetener comprising a sweetener chosen from the group consisting of corn syrup, maltodextrin, and high maltose corn syrup.

10. The process for producing stable produce of claim 9, wherein the immersion solution further comprises salt, and the amount of salt is from about 0% to about 2% by weight.

11. The process for producing stable produce of claim 5, wherein the immersion solution further comprises salt, and the amount of salt is from about 0% to about 2% by weight.

12. The process for producing stable produce of claim 5, wherein the immersion solution further comprises at least one sweetener, in an amount from about 0% to about 35% by weight, with said sweetener comprising a sweetener chosen from the group consisting of corn syrup, maltodextrin, and high maltose corn syrup.

13. The process for producing stable produce of claim 12, wherein the immersion solution further comprises salt, and the amount of salt is from about 0% to about 2% by weight.

14. The process for producing stable produce of claim 4, wherein the immersion solution further comprises an acid chosen from the group consisting of citric acid and ascorbic acid, or a mixture thereof when the vegetable piece comprises a vegetable piece chosen from the group consisting of a potato and a mushroom.

15. The process for producing stable produce of claim 14, wherein the immersion solution further comprises salt, and the amount of salt is from about 0% to about 2% by weight.

16. The process for producing stable produce of claim 14, wherein the immersion solution further comprises from about 0.1% to about 35% of at least one sweetener comprising a sweetener chosen from the group consisting of corn syrup, maltodextrin, and high maltose corn syrup.

17. The process for producing stable produce of claim 16, wherein the immersion solution further comprises salt, and the amount of salt is from about 0% to about 2% by weight.

18. The process for producing stable produce of claim 4, wherein the immersion solution further comprises salt, and the amount of salt is from about 0% to about 2% by weight.

19. The process for producing stable produce of claim 4, wherein the immersion solution further comprises from about 0.1% to about 35% of at least one sweetener comprising sweetener chosen from the group consisting of corn syrup, maltodextrin, and high maltose corn syrup.

20. The process for producing stable produce of claim 19, wherein the immersion solution further comprises salt, and the amount of salt is from about 0% to about 2% by weight.

21. The process for stable produce of claim 3, wherein the immersion solution comprises from about 10% to about 20% by weight cellular stabilizing agent and the cellular stabilizing agent comprises glycerin.

22. The process for producing stable produce of claim 3 wherein the immersion solution comprises from about 5% to 10% by weight cellular stabilizing agent and the cellular stabilizing agent comprises polydextrose.

23. The process for producing stable produce of claim 2, wherein the processed vegetable pieces comprise a water activity of from about 0.82 to about 0.98.

24. The process for producing stable produce of claim 1, wherein the produce piece comprises a fruit piece and the ratio of the produce piece to immersion solution is from about 1:1.5 to about 1:2.5.

25. The process for producing stable produce of claim 24, wherein the immersion solution comprises from about 10% to about 20% by weight cellular stabilizing agent and the cellular stabilizing agent comprises glycerin; and also includes
at least one preservative chosen from the group consisting of potassium sorbate, sodium benzoate, sodium lactate, and sulfites; and
wherein the immersion solution further comprises an acid chosen from the group consisting of citric acid, ascorbic acid, and a mixture thereof; and
wherein the immersion solution further comprises at least one sweetener, in an amount from about 0% to about 35% by weight, and said sweetener comprising a sweetener chosen from the group consisting of corn syrup, maltodextrin, and high maltose corn syrup; and
wherein the fruit piece comprises pineapple.

26. The process of claim 1 in which said produce comprises a vegetable.

27. The process of claim 26 in which said vegetable is broccoli or carrot.

28. A process for producing stable vegetables comprising the steps of:
providing at least one fresh or fresh frozen vegetable piece and an aqueous immersion solution comprising at least one cellular stabilizing agent selected from the group consisting of polyhydric alcohols and water bulking agents;
immersing the vegetable piece in an aqueous immersion solution at about ambient temperature and holding the vegetable piece in the immersion solution at ambient temperature for about one hour to convert the vegetable piece into a heat durable vegetable piece;
subsequently thermally processing by heating the immersion solution with the vegetable piece in the immersion solution to a temperature of from about 180° F. to about 195° F. and then holding the immersion solution at said temperature for about five minutes or less, and optionally agitating the vegetable in the immersion solution;
cooling the thermally processed vegetable in the immersion solution to about ambient temperature or less after thermally processing the vegetable piece to yield a processed vegetable piece;
separating the processed vegetable piece from the immersion solution;
packaging the processed vegetable piece; and
wherein the processed vegetable piece comprises a water activity of from about 0.82 to about 0.98 and a percent moisture content of from about 39% to about 55% and remains stable for at least about five weeks in a refrigerated environment when the immersion solution is substantially free of a preservative and at least about three months in a refrigerated environment when the immersion solution further comprises a preservative.

29. The process for producing stable vegetables of claim 28, wherein the vegetable pieces comprises a vegetable piece chosen from the group consisting of whole, frozen vegetable pieces; whole, fresh vegetable pieces; sectioned, frozen vegetable pieces; and sectioned, fresh vegetable pieces.

30. The process for producing stable vegetables of claim 29, wherein the cellular stabilizing agent comprises a cellular stabilizing agent chosen from the group consisting of glycerin, polydextrose, sorbitol, and propylene glycol; and wherein the at least one cellular stabilizing agent is present in the immersion solution in an amount up to about 60% by weight.

31. The process for producing stable vegetables of claim 30, wherein the immersion solution further comprises a sweetener chosen from the group consisting of corn syrup, maltodextrin, high maltose corn syrup, and mixtures thereof, and the at least one sweetener comprises up to about 35% by weight of the immersion solution.

32. The process for producing stable vegetables of claim 31, wherein the immersion solution further comprises salt and, wherein salt is present in an amount up to about 2% by weight.

33. The process for producing stable vegetables of claim 32, wherein the immersion solution further comprises a preservative chosen from the group consisting of potassium sorbate, sodium benzoate, sodium lactate, sulfites, and mixtures thereof; and wherein the at least one preservative comprises up to about 0.5% by weight of the immersion solution.

34. The process for producing stable vegetables of claim 33, further comprising an acid chosen from the group consisting of ascorbic acid, citric acid, and mixtures thereof; and wherein the acid is present in the immersion solution in an amount of up to about 0.5% by weight.

35. The process for producing stable vegetables of claim 34, wherein the at least one vegetable piece comprises cucumber, and wherein the cellular stabilizing agent comprises polydextrose.

36. The process for producing stable vegetables of claim 34, wherein the immersion solution comprises at least one acid and the at least one vegetable piece comprises a vegetable piece chosen from the group consisting of a mushroom and a potato.

37. The process for producing stable vegetables of claim 34, wherein the at least one vegetable piece comprises a vegetable piece chosen from the group consisting of broccoli, cut beans, zucchini, sweet corn, tomato, and green peas.

38. The process for producing stable vegetables of claim 28, wherein the step of immersing the vegetable piece in an aqueous immersion solution includes holding the vegetable piece in the immersion solution for about an hour at about ambient temperature.

39. The process of claim 28 in which said vegetable is broccoli or carrot.

* * * * *